Jan. 11, 1944.　　C. F. BLACK　　2,339,138
CLAMP
Filed Sept. 18, 1942
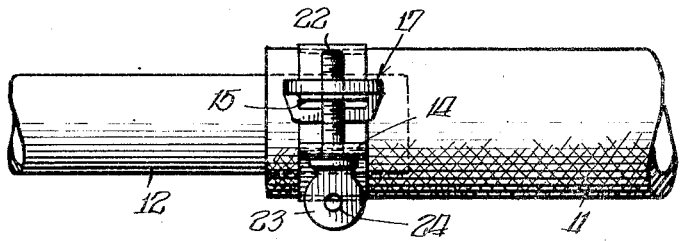
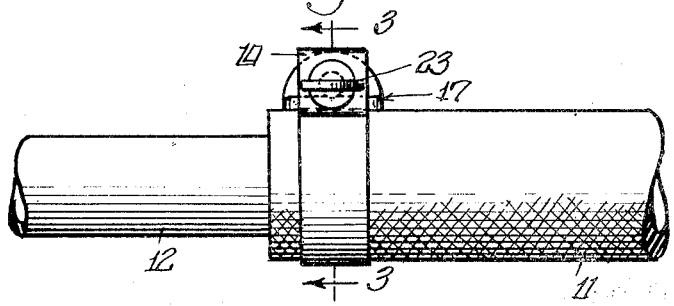
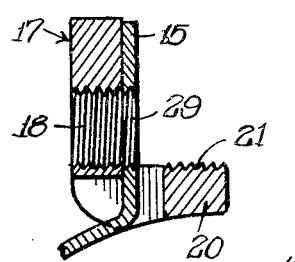
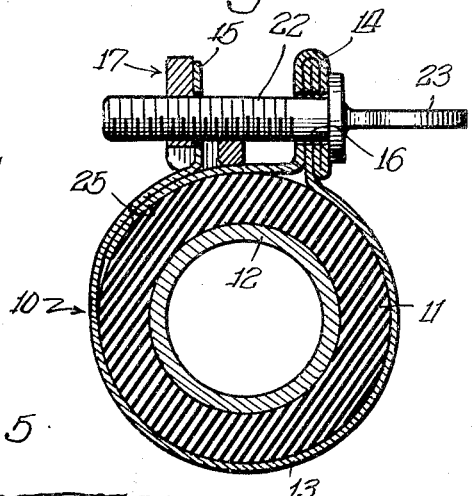
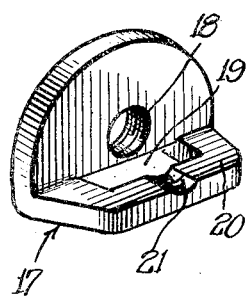
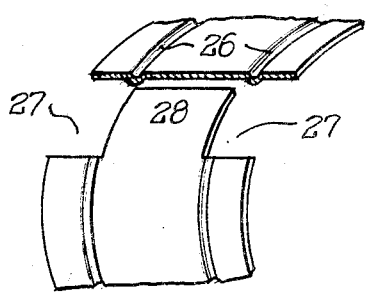
INVENTOR.
Charles F. Black,
BY
Cromwell, Greist & Warden
Attys.

Patented Jan. 11, 1944

2,339,138

UNITED STATES PATENT OFFICE 2,339,138

CLAMP

Charles F. Black, Chicago, Ill., assignor, by mesne assignments, to Central Equipment Co., Chicago, Ill., a corporation of Illinois Application September 18, 1942, Serial No. 458,824

8 Claims. (Cl. 24—19)

The present invention relates to clamps. More particularly, it pertains to a novel type of hose clamp possessing correlated improvements and discoveries whereby the utility of such a clamp is considerably enhanced.

It is customary in securing hoses to pipes to provide a circular band of metal overlying the hose in the vicinity of the pipe and to secure the same thereto by wrapping the clamp around the hose section. In such clamps the band is provided with upstanding end pieces integral with the band and in spaced apart relationship, the end pieces having openings therein. A bolt is passed through the openings and a nut secured thereto and upon successive turns thereof the clamp is drawn about the hose with a view firmly to secure the same in sealed position to the underlying pipe. Such clamps, however, are only as effective as the rigidity of the upstanding end pieces through which the bolt is passed. No reinforcement was ever properly provided for maintaining the rigidity of the upstanding portion and this results in a toeing-in of these elements on conventional clamps and the tightening force and effect directed to the screw is dissipated. Consequently, only a fractional portion of the stresses and strains applied thereto was obtained in attempting properly to secure a hose by means of the customary clamp tightly to the pipe or other object to which it was intended to be secured. Tests have proved that only a fraction of the effectiveness of such a strap could be utilized and in view of this fact the sealing properties which such a clamp was intended to have upon a hose drawn against a pipe was considerably diminished.

A general object of the present invention is to overcome these as well as other disadvantages, and also to provide a hose clamp which is economic of manufacture, simple yet sturdy and durable of construction, easily and readily assembled and applied, and which will function with freedom from mechanical as well as other difficulties and disadvantages.

A principal object of the present invention is the provision of a hose clamp consisting of a circular band having upstanding portions which, of itself, consists of a bracing member and a supplemental or auxiliary bracing member adapted to receive a screw without the use of a nut in a manner whereby the various parts are so mounted that the same can securely be drawn together in axial alignment with respect to each other without distortion and evenly to distribute stresses and strains centrally of said band.

More specifically, an object of the present invention is the provision of a self-locking type of hose clamp wherein a circular band is provided with an interrupted portion near one end which is doubled back upon itself to provide an upright brace with an opening therein at one end, and at its other end a similar upstanding portion parallel to the first named upright brace and also having an opening therein, the last named portion preferably being screw-threaded and being provided with a screw-threaded reinforcing element which is associated therewith and adapted to assume a position similar to the upright brace and in which all of the upstanding portions have a screw-threaded member mounted within the same and in which the reinforcing elements in each case can be drawn together in axial alignment with respect to each other evenly to distribute the stresses and strains centrally of the band.

A further object of the present invention is the provision of such a hose clamp in which the circular band is provided with fluted portions inwardly directed which lend a compensating effect to irregularities in surface contour of a pipe to which such a clamp is intended to bind a hose.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is a plan view illustrating a preferred type of hose clamp depicting sections of a hose and pipe being secured together;

Fig. 2 is an end elevation of the invention illustrated in Fig. 1;

Fig. 3 is a somewhat enlarged transverse sectional view taken along the line 3—3 of Fig. 2 and looking in the direction of the arrows;

Fig. 4 is a perspective view of a preferred type of screw-threaded reinforcing element used in conjunction with the clamping device;

Fig. 5 is a perspective view illustrating a preferred feature partly in section and with parts broken away depicting a novel arrangement of parts; and Fig. 6 is an end elevational view somewhat enlarged for purposes of illustration showing a transverse fragmentary section of one end of a screw-threaded clamping member associated in upright position with the screw-threaded reinforcing element.

Referring more particularly to Fig. 3 of the drawing, there is illustrated generally at 10 a hose clamp mounted over, for example, a rubber or fabric hose 11 which in turn is mounted upon a pipe 12. The clamp consists of a circular band 13 which is interrupted near one end by a plurality of folded upright bracing portions 14. At its other end the circular band terminates in an upright marginal portion 15 which is parallel to the upright brace 14. The brace 14 is provided with a clearance hole 16 and the upright portion 15 may be similarly provided but preferably is screw-threaded. Mounted upon the marginal upright portion 15 is a screw-threaded reinforcing element indicated generally at 17 (see particularly Fig. 4). This element is substantially of L-shape formation having a screw-threaded opening 18 in its upright portion, and an opening 19 near the base of the upright portion in its lower leg or foot portion 20. Also, in this foot portion 20 there is preferably provided a partial screw-threaded area 21. Such a reinforcing element is adapted to be slipped over the marginal upright extension 15 by passing the latter through the opening 19 in the position indicated in the drawing. With this reinforcing element in position the clamp is ready to receive a suitable screw-threaded member, for example, as illustrated at 22, having a flattened thumb-screw head 23, preferably with an opening 24 therein adapted to receive a securing wire or other suitable fastening means. It will also be observed that one end of the circular band associated with the folded over brace 14 projects around the hose and pipe connection under the opposite side of the circular band, directly beneath and a substantial distance inwardly of the upright marginal portion 15 as indicated at 25.

After the device has thus been assembled and mounted, continuous tightening of the screw-threaded member 22 advances the folded over brace 14 and the upright extension end 15 toward each other, the advantages of which will be more fully explained hereinafter.

Preferably the band is marginally provided with parallel spaced apart flutings 26 (Fig. 5). These should appear throughout the entire portion of the circular part of the band and it will also be observed that this feature of the invention has a double function. First, the provision of such a spaced apart set of marginal flutings or beads supplies a particular feature in a novel manner which heretofore has only been accomplished by having a split type of band or double strapping arrangement. For example, the reason for this arrangement in many of the circular types of bands is to overcome surface irregularities often found on the metal pipes to which the flexible hose pieces are connected. Where rough castings are used surface irregularities are apt to cause an insecure seal between the pipe and hose connection. By means of the present construction improved results in seam-sealing are secured without in any manner weakening the band by the removal of portions thereof as in doubly strapped types. It will become apparent that with spaced apart flutings surface irregularities are not likely to interfere with the tightening of the clamp since the distance between these beads or flutings is greater than the combined area of any single irregularities in the surface of a pipe. There is thus provided a clamp with a compound grip, having a primary and secondary sealing effect. Second, it is important that the inner surface of the circular arrangement of the band remain uninterrupted. In order to eliminate undesirable shoulder or offset portions at one end of the band underlying the other portion of the circular piece the end portion can be cut back to effect the marginal removal of certain portions including the flutings as indicated at 27, 27 (Fig. 5). It will be observed that this leaves an end portion 28 which is approximately the width of the space between the flutings and this portion is permitted to come to rest between the flutings and is hidden or lost therein. In this manner any undesirable offset or shoulder portion can readily be absorbed and a substantially complete circular inner face provided.

It is also preferable as an aid in securing a self-locking unit to thread the upstanding end piece 15 of the band 13 as indicated at 29 (Fig. 6).

A clamp constructed in accordance with the features of the present invention has many advantages. For example, the leg portion or foot 20 of the reinforcing element 17 functions to bear down upon the circular band portion and by also having a portion thereof 21 threaded in conjunction with the end piece 15 as at 29, the screw 22 can ride on and rest in the foot portion and thus undue stresses and strains are prevented. This threading arrangement also acts as a guiding point for the screw and keeps the upright bracing portion in axial alignment therewith and in this manner a radial distribution throughout the strap of stresses and strains is maintained. In having the strap portion 29 screw-threaded a definite self-locking effect is obtained as well as protection given to the threads of the screw 22. In addition to this, the reinforcing element eliminates the use of a nut and a self-contained unit is provided with nothing to slip out of place. In addition to this, the clamping device is a self-contained unit in the sense that everything is so associated and related that nothing can slip out of position or caused to become loosened. In view of the foregoing it will be observed that for the first time it appears to be possible to take care of the entire strength contained within the circular band.

It will thus be seen that the objects hereinbefore set forth may readily and efficiently be attained and since certain changes may be made in the above described article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A clamp, which comprises a circular band interrupted near one end with portions thereof being folded back upon itself to provide an upright brace and having an opening therein, said band terminating at its other end in an upright marginal portion parallel to said first named upright brace and also having an opening therein, a reinforcing element having a screw-threaded opening therein associated with said marginal upright portion and adapted to assume a position similar to said upright brace and marginal end portion, with an inwardly directed base extension on said reinforcing element and a screw-threaded member mounted within said openings whereby the parallel upright portions of said band and said reinforcing element can be drawn together and maintained in axial alignment with respect to each other evenly to distribute stresses and strains centrally of said band, said inwardly directed base extension exerting pressure on a portion of said clamp underlying its base area and maintaining all upright portions in parallel alignment evenly to distribute pressure around said clamp.

2. A hose clamp, which comprises a circular band interrupted near one end with portions thereof being folded back upon itself to provide an upright brace and having an opening therein, said band terminating at its other end in an upright marginal portion parallel to said first named upright brace and also having an opening therein, a reinforcing element having a screw-threaded opening therein associated with said marginal upright portion adapted to assume a position similar to said upright brace, said reinforcing element consisting of a substantially L-shaped member having an inwardly directed base, and a screw-threaded member mounted within said openings whereby the parallel upright portions of said band and said reinforcing element can be drawn together and maintained in axial alignment with respect to each other evenly to distribute stresses and strains centrally of said band.

3. A hose clamp, which comprises a circular band having an upright brace near one end with an opening therein, said band terminating at its other end in an upright marginal portion parallel to said upright brace and also having an opening therein, a reinforcing element having a screw-threaded opening associated with said marginal upright end portion and adapted to assume a position similar to said upright brace and marginal portion, said reinforcing element consisting of a substantially L-shaped member with its base inwardly directed having screw threads in each leg portion, and a screw-threaded member mounted within said openings and threaded with said reinforcing element whereby the parallel upright portions of said band can be drawn together and maintained in axial alignment with respect to each other evenly to distribute stresses and strains centrally of said band.

4. A hose clamp, which comprises a circular band interrupted near one end with portions thereof being folded back upon itself to provide an upright brace and having an opening therein, said band terminating at its other end in an upright marginal portion parallel to said first named upright brace and also having an opening therein, a screw-threaded reinforcing element associated with said marginal upright portion and adapted to assume a position similar to said upright brace and marginal end portion, said screw-threaded element consisting of a substantially L-shaped member with its base inwardly directed, said first named upright brace having an extension portion underlying the entire area of said L-shaped member, and a screw bolt mounted within said openings and said reinforcing element whereby the parallel upright portions of said band and reinforcing element can be drawn together in axial alignment with respect to each other evenly to distribute stresses and strains centrally of said band.

5. A hose clamp, which comprises a circular band having an upright brace near one end with an opening therein, said band having spaced apart fluted portions inwardly depressed continuously around the band, the other end of said band terminating in an upright marginal portion parallel to said first named upright brace and also having an opening therein, a screw-threaded reinforcing element having an inwardly extending base associated with said marginal upright portion adapted to assume a position similar to said upright brace and marginal end portion, and a screw-threaded link mounted within said openings and said reinforcing element whereby the parallel upright portions of said band can be drawn together in axial alignment with respect to each other evenly to distribute stresses and strains centrally of said band, said fluted portions lending a compensating effect caused by irregularities in surface contour of a pipe to which said clamp is intended to bind a hose.

6. A self-locking hose clamp, which comprises a circular band interrupted near one end with portions thereof being folded back upon itself to provide an upright brace with an opening therein, said band terminating at its other end in an upright portion parallel to said first named upright brace and also having an opening therein, said last named opening being screw-threaded, a screw-threaded reinforcing element having an inwardly directed base screw-threaded on its upper surface associated with said marginal upright portion adapted to assume a position similar to said upright brace and marginal end portion, and a screw-threaded link member mounted within said openings and said reinforcing element whereby the parallel upright portions of said band can be drawn together in axial alignment with respect to each other evenly to distribute stresses and strains centrally of said band.

7. A self-locking hose clamp, which comprises a circular band interrupted near one end with portions thereof being folded back upon itself to provide an upright brace and having an opening therein, said band terminating at its other end in an upright marginal portion parallel to said first named upright brace and also having an opening therein, a screw-threaded reinforcing element with an inwardly directed base associated with said marginal upright portion, and having an opening therein penetrated by said upright marginal portion, said reinforcing element being adapted to assume a position similar to said upright brace and marginal end portion, and a screw-threaded link member mounted within said openings and said reinforcing element whereby the parallel upright portions of said band can be drawn together and maintained in axial alignment with respect to each other.

8. A self-contained hose clamp locking unit, which comprises a circular band interrupted near one end with portions thereof being folded back upon itself to provide an upright brace with an opening therein, said band also having marginal spaced apart flutes substantially throughout its circular area with its other end having cut-out portions inwardly extending marginally to provide a tongue portion of a diameter equal to the distance between said flutes, said tongue lying concealed between said flutes, its end extending in an upright position parallel to said first named upright brace and also having an opening therein, a screw-threaded reinforcing element associated with said tongue and adapted to assume a position similar to said upright brace, and a screw bolt mounted within said openings and said reinforcing element whereby parallel upright portions can be drawn together in axial alignment with respect to each other evenly to distribute stresses and strains centrally of said band, said fluted portions lending a compensating effect to overcome surface irregularities of a pipe to which said clamp is intended to bind a hose.

CHAS. F. BLACK.